(12) United States Patent
Llorente Gonzalez et al.

(10) Patent No.: US 8,406,934 B2
(45) Date of Patent: Mar. 26, 2013

(54) SYSTEM FOR REGULATING THE ACTIVE POWER OF A WIND FARM

(75) Inventors: Jose Ignacio Llorente Gonzalez, Pamplona (ES); Maria Jose Martinez De Lizarduy Romo, Pamplona (ES)

(73) Assignee: Gamesa Innovation & Technology, S.L., Pamplona (Navarra) (ES)

( * ) Notice: Subject to any disclaimer, the term of this patent is extended or adjusted under 35 U.S.C. 154(b) by 1265 days.

(21) Appl. No.: 10/591,303

(22) PCT Filed: Mar. 4, 2005

(86) PCT No.: PCT/ES2005/000111
§ 371 (c)(1),
(2), (4) Date: Jan. 11, 2010

(87) PCT Pub. No.: WO2005/085634
PCT Pub. Date: Sep. 15, 2005

(65) Prior Publication Data
US 2010/0280672 A1    Nov. 4, 2010

(30) Foreign Application Priority Data
Mar. 5, 2004   (EP) .................................... 04380051

(51) Int. Cl.
*G05D 11/00*   (2006.01)
*H02J 3/00*   (2006.01)

(52) U.S. Cl. ............. 700/287; 700/293; 290/44; 290/55
(58) Field of Classification Search .................. 700/287, 700/293; 290/44, 55
See application file for complete search history.

(56) References Cited

U.S. PATENT DOCUMENTS

| | | | | |
|---|---|---|---|---|
| 6,724,097 | B1 * | 4/2004 | Wobben | 290/44 |
| 6,906,431 | B2 * | 6/2005 | Wobben | 290/44 |
| 6,965,174 | B2 * | 11/2005 | Wobben | 290/44 |
| 7,638,893 | B2 * | 12/2009 | Wobben | 290/55 |
| 2002/0029097 | A1 * | 3/2002 | Pionzio et al. | 700/286 |
| 2003/0102675 | A1 | 6/2003 | Noethlichs | |
| 2007/0035135 | A1 * | 2/2007 | Yoshida | 290/44 |

FOREIGN PATENT DOCUMENTS

| | | |
|---|---|---|
| WO | 01/25630 | 4/2001 |
| WO | 01/73518 | 10/2001 |

* cited by examiner

*Primary Examiner* — Jeffrey A Gaffin
*Assistant Examiner* — Douglas Lee
(74) *Attorney, Agent, or Firm* — Ladas & Parry LLP

(57) ABSTRACT

An active power regulation process and system of a wind farm comprising an array of aerogenerators (AI), a communications network (RS), and a monitoring and control system (ST). The system of the invention comprises:

means for connecting to said monitoring and control system (ST), means for receiving data relative to the apparent power $P_{out}$ put out by the farm at all times, and data relative to variables and states of the aerogenerators (Ai) from said monitoring and control system (ST), means for comparing said output apparent power $P_{out}$ with a preset apparent power set-point $P_{cons}$ of the farm, means for continuously adjusting said output apparent power $P_{out}$, such that this output apparent power $P_{out}$ approaches at all times the preset power set-point $P_{cons}$.

10 Claims, 1 Drawing Sheet

SYSTEM FOR REGULATING THE ACTIVE POWER OF A WIND FARM

FIELD OF THE INVENTION

The present invention refers to an active power regulating system of a wind farm, system which is integrated in the control and monitoring system of the wind farm itself.

BACKGROUND OF THE INVENTION

Essentially, an aerogenerator produces electricity in the following manner: wind rotates the aerogenerator rotor, causing the turning of a generator (a dynamo) which produces electricity.

The main components of the nacelle of an aerogenerator are:
  The rotor: constituted by blades which pick up the wind; it is bolted to the main shaft.
  The main shaft: between the rotor and the multiplier.
  The multiplier: connected between the rotor (at the other end of the main shaft) and the electric generator.
  The electric generator.
  The crown system: it allows the turning of the nacelle so as to position itself facing the wind according to the signal from the weather vane connected to the control system.
  The control system: it controls most of the parts of the aerogenerator; thus, for example, it controls the crown system.

A wind farm is formed by one or more aerogenerators (up to hundreds of them) and other elements such as a transforming center or electric substation and one or more weather towers. All these elements are usually monitored by a farm monitoring and control system (or remote control) installed in a main computer located in the wind farm itself and connected to the aerogenerators via a local communications network. The application installed in this main computer collects the operation variables from said elements as well as the alarms that occur in them.

Currently, the generated power of a wind farm is put out entirely to the distribution network. Thus, if the utility company authorizes a maximum power supply of X MW, the aerogenerators installation, with regard to number and rated power, shall be adjusted to this limitation. Typically, in base of this power limitation, a study of the site and possible machine locations is carried out so as to determine the optimum number of aerogenerators to be installed in order to obtain the maximum output.

DESCRIPTION OF THE INVENTION

The invention relates to a system and an active power regulation process of a wind farm so as to obtain as an output the desired apparent power according to claims 1 and 5, respectively. Preferred embodiments of the system and method are defined in the dependent claims.

It is an object of the present invention to provide a power regulating system which allows optimizing the output of a farm by increasing the number of installed machines. In this situation, the possibility of carrying out an installation, the power generation rated capacity of which exceeds that which is authorized by the utility company, may be considered, therefore the regulating system of the invention ensures that the output power at a given instant does not exceed the established limits.

Traditionally, generation of no reactive power was sought in wind farms, hence cosPhi equals 1, and therefore apparent power equals active power. However, throughout this specification apparent power and active power are distinguished, and thus we speak of apparent power when making reference to the final power to be obtained in the farm, the output power. And we speak of active power, applied to the regulation set-point of the machines, as it is this particular parameter upon which the regulator acts; upon the active power set-point.

The active power regulating system of the invention has the capability for dynamically regulating the apparent power generation of a wind farm.

That is, the power regulating system of the invention, which is either wholly integrated in the control and monitoring system of the wind farm or connected to it, has the capability for performing the following functions:
  Farm power restriction (sending of HOLD commands to the machines for canceling the total power excess with regard to an established set-point. Machine shutdown is performed according to priorities automatically calculated according to weighting criteria); and
  Apparent farm power regulation (continuous adjustment of the total output power of the farm so as to optimally approach an established set-point. The adjustment is executed through a change of the rated active power set-point of the machine).

The invention relates to an active power regulating system of a wind farm, the wind farm comprising an array of aerogenerators Ai, a communications network RS, and a monitoring and control system ST. The regulating system comprises:
  means for connecting to said monitoring and control system,
  means for receiving data relative to the apparent power $P_{out}$ put out by the farm at all times, and data relative to variables and states of the aerogenerators, from said monitoring and control system ST,
  means for comparing said output apparent power $P_{out}$ with a preset apparent power set-point $P_{cons}$ of the farm,
  means for continuously adjusting said output apparent power $P_{out}$, such that this $P_{out}$ approaches at all times the preset power set-point $P_{cons}$.

In this manner, by having the farm regulation capability, the rated power of the farm, calculated as a sum of the rated powers of the aerogenerators Ai constituting the farm, may be greater than the maximum power value authorized by the utility company.

As indicated, the monitoring and control system ST supplies the collected information from the aerogenerators of the farm (variables and states thereof), as well as from the electric substation (output apparent power $P_{out}$) to the power regulating system; hence, the electric substation shall be integrated in the monitoring and control system for reading the active and the reactive power the farm is putting out to the grid and calculating therewith the output apparent power $P_{out}$ of the farm.

The preset power set-point $P_{cons}$ of the farm may be dynamically updated, e.g. from an operation office.

This set-point $P_{cons}$ is the value that the total power of the farm has to tend to. The more the regulating system of the invention approaches this regulation set-point $P_{cons}$, the more optimal it will be, even when taking into account the slowness of the response of the system (farm) when facing the request for new set-points and the variability of the wind at the site.

Preferably, the means for continuous adjustment of the output apparent power $P_{out}$ comprise:
  means for calculating the regulation capability of the farm at every moment according to said data relative to the output apparent power $P_{out}$ and said data relative to variables and states of the aerogenerators Ai, means for selecting which aerogenerator or aerogenerators $Ai_{selec}$ may be actuated, according to said data relative to variables and states of the aerogenerators Ai, means for sending to said one or more aerogenerators $Ai_{selec}$ selected, via the monitoring and control system ST and the communications network RS of the farm, commands relative to:

regulation of the active power set-point, or operating point, and/or shutdown and startup.

In the case of sending a shutdown command of one or more aerogenerators (e.g. for restricting the output power), the former is applied in a non-random, controlled manner, i.e. the priority of the affected machines is continuously evaluated according to two types of criteria:

Fixed. Some of the fixed criteria to be applied are: types of machines (power); location of the machines in the farm; manual operator selection.

Variable. Some of the variable criteria to be applied are: total power produced by the aerogenerator or machine; number of alarms of the machine (according to the type of alarm).

Each one of these fixed and variable criteria is assigned a weight during the configuration stage of the regulating system, so that the application of these weights to each one of the fixed and variable criteria determines a shutdown priority order for each aerogenerator, to cancel thus the total power excess with regard to the established set-point.

The regulation capability of the farm is calculated as the sum of the regulation capability of each aerogenerator or machine. The regulation capability of each machine is calculated according to the last instant active power read of the machine and of the previously configured minimum regulation limit. The active power set-point minimum limit a machine can be adjusted to is, e.g. 65% of the characteristic rated power; i.e. in a machine with an 850 kW characteristic rated power, the rated power minimum set-point allowed is its 65%, i.e., 552 kW. Therefore, regulation capability of a machine at any given time will be the difference between the current active power and 65% of the rated power of the type of machine in question, i.e., an 850 kW machine generating 700 kW at a time $t_0$ will have a regulation capability of 700−522=148 kW.

In other words, the power regulating system of the invention performs an optimized power adjustment when the total power $P_{out}$ put out (or produced) in a farm exceeds or is below a given set-point $P_{cons}$.

Preferably, the regulating system may also comprise a safety control with:

means for comparing said output apparent power $P_{out}$ with a preset safety power set-point $P_{cons.seg}$ of the farm, so that if said $P_{out}$ is greater than $P_{cons.seg}$, the system sends an emergency shutdown command to one or more aerogenerators (Ai).

In the power regulating system of the invention, certain parameters may be configured according to a series of considerations of the operation environment such as, for example, the maximum time a particular power may be exceeded, either for substation protection or for applying penalties; the time for sampling the aerogenerators by the monitoring and control system of the farm; or wind distribution in the farm.

This parameterization or adjustment of the regulating system can take some time until it is adapted to the particular farm conditions.

Power restriction may also be applied to the scope of several wind farms, which as a whole may not exceed a total output power established due to limitations in the common collecting substation.

The regulation set-point $P_{cons}$ is established according to certain environmental criteria, for example:

The number of machines in the branch line, in case of having a serial communications network in the farm, as the more machines there are in the branch line, the greater the deviation on the instant operating conditions will be, and therefore the greater the deviation with regard to the established set-point will be.

In case there is hardware protection present in the substation triggering when reading an output power greater than that restricted by the utility company.

Site characteristics according to wind distribution across the farm, since the fact that the some machines are subjected to more wind than others sometimes means a reduction of the regulation capability of the farm.

On the other hand, the safety set-point $P_{cons.seg}$ is established with the aim of protecting the farm from undesired substation triggering or applying penalties for output above that allowed by the utility company.

When a total power increase exceeding this safety limit is detected while in the farm power regulation stage, this means that the system response is not going to be fast enough to compensate this output power excess. Then, the regulator launches a series of actions intended for immediately solving the situation, e.g. by sending controlled emergency shutdown commands to the machines.

The invention also relates to an active power regulation process of a wind farm, the wind farm comprising a group of aerogenerators (Ai), a communications network (RS), and a monitoring and control system (ST), the process comprising:

receiving from said monitoring and control system (ST) data relative to the apparent power $P_{out}$ put out at all times by the farm, and data relative to variables and states of the aerogenerators (Ai), comparing said output apparent power $P_{out}$ with a preset apparent power set-point $P_{cons}$ of the farm, continuously adjusting said output apparent power $P_{out}$, so that this output apparent power $P_{out}$ approaches at all times the preset power set-point $P_{cons}$.

Preferably, the continuous adjustment of the output apparent power $P_{out}$ comprises:

calculating the regulation capability of the farm for each moment according to said data relative to the output apparent power $P_{out}$ and said data relative to variables and states of the aerogenerators (Ai), selecting which aerogenerator or aerogenerators ($Ai_{selec}$) may be actuated, according to said data relative to variables and states of the aerogenerators (Ai), sending to said one or more selected aerogenerators ($Ai_{selec}$), via the monitoring and control system (ST) and the communications network (RS) of the farm, commands relative to:

regulation of the active power set-point, or operating point, and/or shutdown or startup.

When the continuous adjustment of the output apparent power $P_{out}$ implies sending commands relative to the shutdown of one or more aerogenerators (Ai), said selection is performed according to a set of pre-established criteria.

The process of the invention may also comprise a safety control wherein:

Said output apparent power $P_{out}$ is compared with a preset power safety set-point $P_{cons.seg}$ of the farm, such that if said $P_{out}$ is greater than $P_{cons.seg}$, a shutdown command is sent to one or more aerogenerators (Ai).

The process of the invention may operate according to an operating mode in which regulation of the active power set-point, or operating point, of said one or more aerogenerators is prioritized with respect to shutdown or startup of another or other aerogenerators; in such a case, the power in those aerogenerators selected for it is regulated to the maximum, and when a greater restriction is necessary, shutdown of one or more aerogenerators will be initiated.

It can also operate according to an operating mode in which passage to shutdown or startup of said one or more aerogenerators is prioritized with respect to regulation of the power set-point, or operating point, of another or other aerogenerators; in such a case, one or more aerogenerators is shut down or started up, and as fine adjustment, the power of another or other aerogenerators is regulated according to the power necessity.

Preferably, the system of the invention includes means for calculating the active power trend, of an aerogenerator, i.e. of the power forecasted in n seconds.

The power regulating system of the invention thereby allows for correcting the output apparent power $P_{out}$ not based on the power read at a given moment at the output of the substation, but based on an active power forecasting algorithm allowing for obtaining said value provided for some subsequent seconds.

The active power forecasting algorithm is based on the follow-up of the trend of the total farm power variable according to its historical values.

Interest in regulation based on active power forecasting presents itself when the environmental conditions demand sufficiently fast actuation of the regulator. The fact that the system to be regulated, an aerogenerator farm, is a slow reacting system, has to be taken into account. As has been mentioned throughout the description, the commands sent by the regulator 2 have their effect after several seconds. Occasionally, the installation does not allow for this reaction time, whereby it is necessary to jump ahead of the behavior of the system in order to prevent substation triggering or the like.

Given the complexity involved with determining the active power value several seconds ahead of time, it is possible that regulating in this manner means loosing some adjustment precision. Nevertheless, it is considered assumable against causing substation triggering, which would stop the entire farm, or against penalty application.

BRIEF DESCRIPTION OF THE DRAWINGS

A series of drawings that aid in better understanding the invention and which are expressly related to an embodiment of said invention, which is presented as non-limiting example thereof, will be described below.

DESCRIPTION OF A PREFERRED EMBODIMENT OF THE INVENTION

Figure 1:
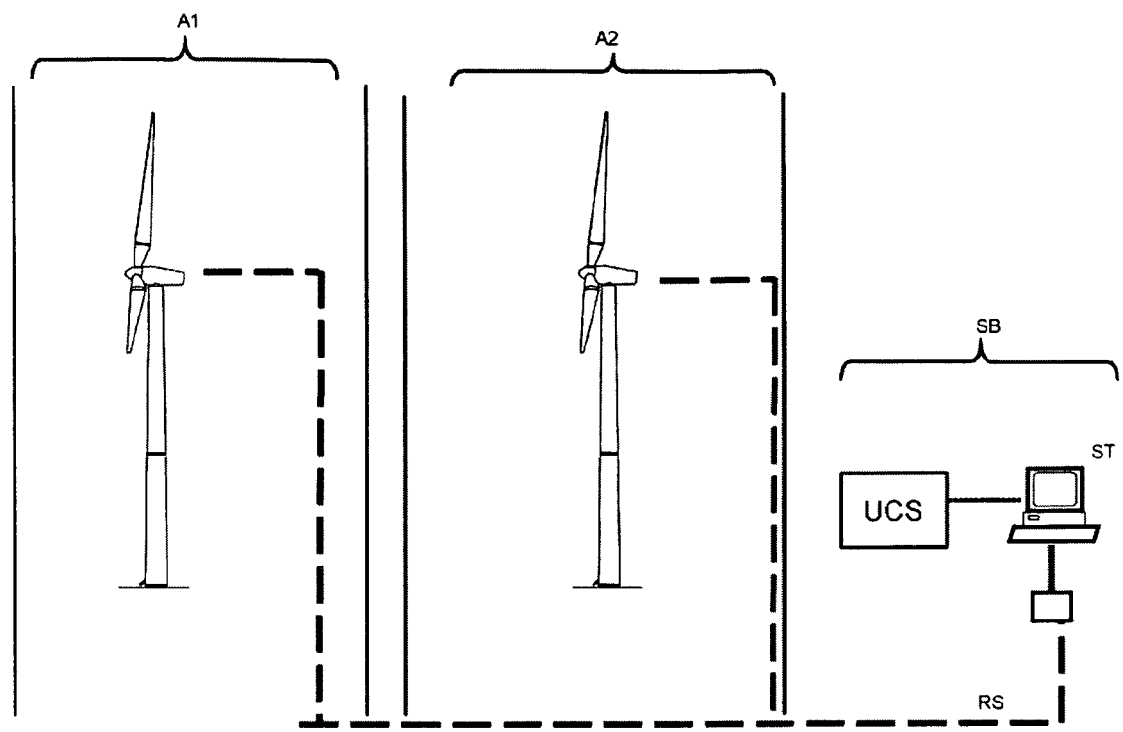
FIG. 1 shows a generic schematic view of a wind farm.

FIG. 1 shows a simple schematic view of a wind farm; to prevent complexity of the drawing, in this farm, two aerogenerators A1 and A2, and a transformation center or electrical substation SB are shown. The different elements of the farm are supervised by a farm monitoring and control system ST (or remote control) installed in a main computer located on the wind farm itself and connected to the aerogenerators via a local communications network RS, e.g. an RS-232 network. The application installed in this main computer collects the operation variables of the farm elements, their state, as well as alarms occurring in them. In addition, the farm may have a communications network RE via Ethernet (not shown). The farm monitoring and control system ST is likewise connected to the substation main unit UCS, through which information from the substation SB itself is received.

Figure 2:
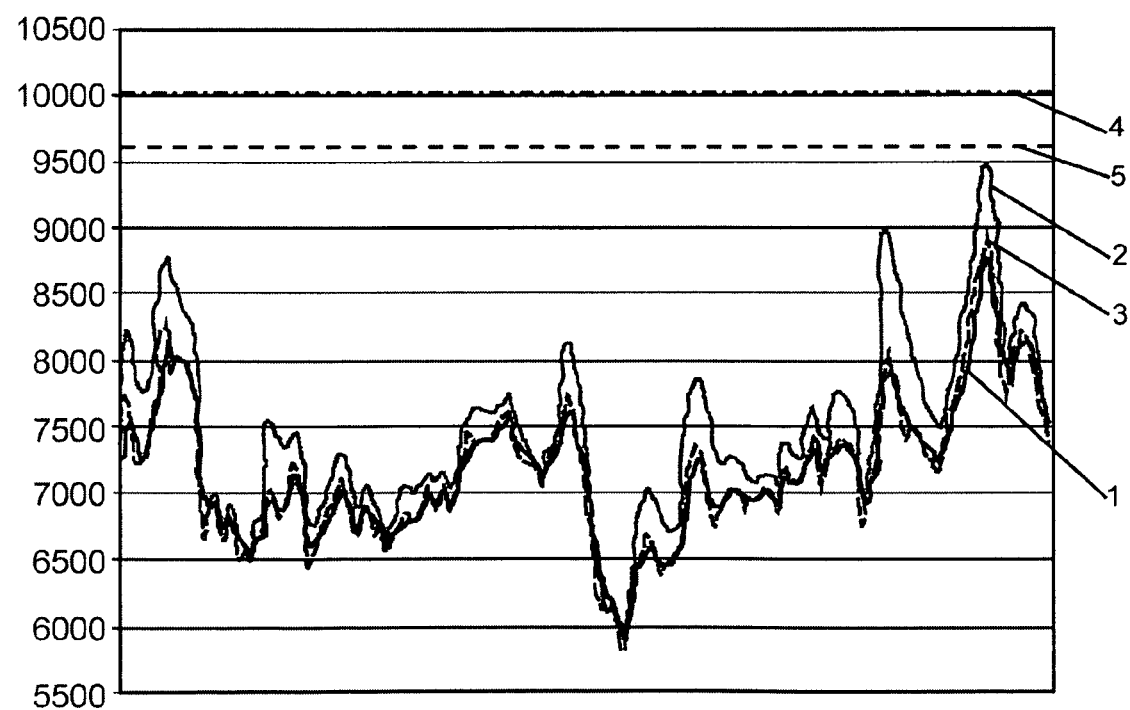
FIG. 2 shows a graph representing the read total power values of the substation.

A graph representing the total power values read in the substation is shown in FIG. 2:

Curve 1 shows the output apparent power $P_{out}$ read from the substation whereas Curves 3 and 2 show the forecasted power values at n seconds (i.e. the power value provided for a few subsequent seconds) and the forecasted regulation active power, respectively; on the other hand, Line 4 shows the safety set-point $P_{cons.seg}$ (established with the purpose of protecting the farm from undesired triggering of the substation or the application of penalties for outputs above that allowed by the utility company) and Line 5 shows power regulation set-point $P_{cons}$.

Configuration of the Application

The application allows for an operator to perform certain configuration operations on the regulating system operating mode, such as for example:

1. Adjusting a set of parameters relative to:
   Activating/deactivating the power regulation functionality for one or more aerogenerators.
   Establishing the set-points restricting functioning of the algorithm: the regulation set-point (which can be dynamically updated) and the safety set-point (causes "instant" aerogenerator or machine shutdowns); the regulation forecasting time set-point and the safety forecasting time set-point (forecasted power value causing "instant" machine shutdowns).
   Establishing the parameters relative to the log file of the application.
   Establishing the scope of application of the regulating system: number of machines, rated power % indicating the minimum rated power (set-point) which can be applied to an aerogenerator (this value is determined by the Control System of the aerogenerator).
2. Machines can be disabled for this power regulation functionality, such as, e.g. machines causing problems or it not being desirable for them to be shut down or regulated for any reason.
3. Weighting values of the fixed and variable criteria prioritizing the sending of a shutdown command of some machines over others can be established.
4. It is also possible to configure the branch lines of the farm according to the topology of the communications network of the farm.
5. The application allows for consultation of the state of the machines in relation to the application of the algorithm at all times, showing the data about the application of the algorithm in each aerogenerator.

Operation of the Application

Once the complete configuration of the application has been performed, execution starts of the regulating loop continuously correcting the apparent power $P_{out}$ measured at the output of the substation for adjusting to the power regulation set-point $P_{cons}$, which is manually or dynamically (e.g. from another tool) introduced in the application.

Regulation is applied in the following manner:
    If output power $P_{out}$ exceeds regulation set-point $P_{cons}$, the system will correct the "overpower" by applying either of the following two criteria (according to the configuration of the functionality):

Prioritizing Regulation of the Aerogenerators

In this case, the active power of those machines designated therefore will be regulated to the maximum, and when greater restriction is necessary, shutdown of the machines will be initiated.

Prioritizing the Passage to Machine Hold

In this case, one or several machines will be shut down, and as fine adjustment, it will regulate the power of others (according to the configuration) until the produced power is within the limit.

If the output apparent power $P_{out}$ falls below the regulation set-point $P_{cons}$, the system will startup some of the machines it itself has put on hold, or will vary (raise) the power set-point of the machines that were regulated, according to the power necessity.

The power set-point regulation strategy and that for the shutdown/startup of the machines are executed simultaneously. However, in order to better understand them, they are described separately.

Description of the Power Regulating System

Input data of the power regulating system are, on one hand, the reading of the active and reactive power measured in the output line of the substation and, on the other hand, the variables and states of the aerogenerators.

The output apparent power $P_{out}$ is calculated with the active and reactive output power and is compared with farm power regulation set-point $P_{cons}$. Sampling times for these values range from 0.5 to 1.5 seconds.

The regulation capacity that the farm has at any given time is calculated with the active power and state values of the machines. It has to be considered that wind distribution in a farm may not be homogenous, so that not all of the aerogenerators have the same regulation capacity; in fact, some of them may have no regulation capacity at all.

In the case of a serial communications network in the farm, the sampling time of the variables of the aerogenerator will depend on the number of machines per branch line; about 0.6 seconds per machine * can be considered number of machines in the branch line. In case of an Ethernet network, all may be sampled at about 1 Hz.

Regulation consists in varying the active power set-point of the aerogenerators. Once the regulation capacity of the aerogenerators is calculated, the algorithm determines the new set-point, which is sent to all the machines at the same time.

Reaction time of the aerogenerators before the new rated power set-point depends on the power to be increased or decreased; 3 or 4 seconds can be taken as a reference.

The new rated set-point will make the total apparent power approach the power set-point, and the loop is closed with a new sampling of the output power of the farm.

Description of the Machine Shutdown and Startup Algorithm

The way of prioritizing machine shutdown is achieved by configuring the tool such that hardly any regulation margin is left; for example:

activating none or very few of the machines for regulation, or increasing the limit % of the rated active power of the aerogenerator.

The system continuously calculates the machine shutdown priority according to weighting of the fixed and variable criteria applied to the read values of the aerogenerators via the remote control.

When the regulating system determines that it is necessary to shut down one or several machines, the corresponding shutdown command is sent to the first machine in the list, and thereby successively, with an interval of seconds between command and command. This interval of seconds can be configured.

There are two types of machine shutdown: normal machine shutdown and machine safety shutdown.

1. Normal Machine Shutdown

Normal machine shutdown occurs when the read power is above the power regulation set-point $P_{cons}$ and below the safety set-point $P_{cons.seg}$, and this excess may not be cancelled with the regulation capability that the farm has at that instant.

Then, the system selects the machine with the greatest priority from the list of aerogenerators under regulation and sends to it a HOLD command. The time it takes for putting a machine on hold depends on the power which is generating at that instant: putting on hold can be considered as taking a time of about 20 seconds.

2. Machine Safety Shutdown

A machine safety shutdown occurs when the read power is above the safety set-point $P_{cons.seg}$.

Then, the system selects the machine with the greatest priority from the list aerogenerators under regulation and sends to it an EMERGENCY command, which amounts to a controlled emergency shutdown, and immediately disconnects the machine from the grid, and after 35 seconds, it applies braking.

When the regulating system determines that it is necessary to shut down one or several machines, the corresponding run command is sent to the machine which has been shut down the longest, and thereby successively, with an interval of seconds between command and command. This interval of seconds may be configured in the application.

The system will not send a command for starting up any machine that the system itself has not shut down. Thus, there will be no interference with any other operation of the farm.

Lastly, in case of wanting to perform power regulation based on power forecasting, the manner of activating it is assigning values in seconds to the collected parameters in the configuration window of the system.

The invention claimed is:

1. An active power regulating system of a wind farm, the wind farm comprising an array of aerogenerators (Ai), a communications network (RS), and a monitoring and control system (ST), the system comprising:

connecting means to said monitoring and control system (ST), wherein the system further comprises:

means for receiving data relative to the apparent power $P_{out}$ put out by the farm at all times, and data relative to variables and states of the aerogenerators (Ai), from said monitoring and control system (ST), means for comparing said output apparent power $P_{out}$ with a preset apparent power set-point $P_{cons}$ of the farm, means for continuously adjusting said output apparent power $P_{out}$, which comprises means for changing the active power set-point of the aerogenerators, such that this output apparent power $P_{out}$ approaches at all times the preset power set-point $P_{cons}$.

2. A system according to claim 1, wherein said means for continuous adjustment of the output apparent power $P_{out}$ comprise:

means for calculating the regulation capability of the farm at every moment according to said data relative to the output apparent power $P_{out}$ and said data relative to variables and states of the aerogenerators (Ai), means for selecting which aerogenerator or aerogenerators ($Ai_{selec}$) may be actuated, according to said data relative to variables and states of the aerogenerators (Ai), means for sending to said one or more aerogenerators (Ai$_{selec}$) selected via the monitoring and control system (ST) and the communications network (RS) of the farm, commands relative to:
regulation of the active power set-point, or operating point, and/or
shutdown and startup.

3. A system according to claim 1, further comprising a safety control with:
means for comparing said output apparent power P$_{out}$ with a preset safety power set-point P$_{cons.seg}$ of the farm, so that if said P$_{out}$ is greater than P$_{cons.seg}$, the system sends a shutdown command to one or more aerogenerators (Ai).

4. A system according to claim 1, further comprising means for calculating the active power trend.

5. An active power regulation process of a wind farm, the wind farm comprising a group of aerogenerators (Ai), a communications network (RS), and a monitoring and control system (ST), the process comprising:
receiving from said monitoring and control system (ST) data relative to the apparent power P$_{out}$ put out at every moment by the farm, and data relative to variables and states of the aerogenerators (Ai),
comparing said output apparent power P$_{out}$ with a preset apparent power set point P$_{cons}$ of the farm,
continuously adjusting said output apparent power P$_{out}$, by changing the active power set-point of the aerogenerators, so that this output apparent power P$_{out}$ approaches at every moment the preset power set-point P$_{cons}$.

6. A process according to claim 5, in which the continuous adjustment of the output apparent power P$_{out}$ comprises:
calculating the regulation capability of the farm for each moment according to said data relative to the output apparent power P$_{out}$ and said data relative to variables and states of the aerogenerators (Ai),
selecting which aerogenerator or aerogenerators (Ai$_{selec}$) may be actuated, according to said data relative to variables and states of the aerogenerators (Ai),
sending to said one or more selected aerogenerators (Ai$_{selec}$), via the monitoring and control system (ST) and the communications network (RS) of the farm, commands relative to:
regulation of the active power set-point, or operating point, and/or
shutdown or startup.

7. A process according to claim 6, wherein when the continuous adjustment of the output active power P$_{out}$ implies sending commands relative to the shutdown of one or more aerogenerators (Ai), said selection is performed according to a set of pre-established criteria.

8. A process according to claim 5, further comprising a step of safety control of:
comparing said output active power P$_{out}$ with a preset power safety set-point P$_{cons.seg}$ of the farm, and if said P$_{out}$ is greater than P$_{cons.seg}$, sending a shutdown command to one or more aerogenerators (Ai).

9. A process according to claim 6, in which regulation of the power set-point, or operating point, of said one or more aerogenerators is prioritized with respect to the shutdown or startup of another or other aerogenerators.

10. A process according to claim 6, in which the shutdown or startup of said one or more aerogenerators is prioritized with respect to the regulation of the power set-point, or operating point, of another or other aerogenerators.

* * * * *